United States Patent
Borland et al.

[11] Patent Number: 5,474,711
[45] Date of Patent: Dec. 12, 1995

[54] THICK FILM RESISTOR COMPOSITIONS

[75] Inventors: William Borland; Keiichiro Hayakawa, both of Kanagawa; Takeshi Sato, Tokyo; Jerome D. Smith, Kanagawa, all of Japan

[73] Assignee: E. I. Du Pont de Nemours and Company, Wilmington, Del.

[21] Appl. No.: 310,611

[22] Filed: Sep. 22, 1994

Related U.S. Application Data

[63] Continuation of Ser. No. 71,847, May 7, 1993, abandoned.

[51] Int. Cl.$^6$ .............................. H01B 1/00; H01B 1/06; H01B 1/08
[52] U.S. Cl. ................ 252/518; 252/521; 106/1.25; 106/1.28
[58] Field of Search ................ 252/500, 518, 252/521; 106/1.25, 1.28

[56] References Cited

U.S. PATENT DOCUMENTS

| | | | |
|---|---|---|---|
| 4,302,362 | 11/1981 | Hoffman et al. | 252/520 |
| 4,476,039 | 10/1984 | Hormadaly | 252/518 |
| 5,096,619 | 3/1992 | Slack | 252/514 |

FOREIGN PATENT DOCUMENTS

| | | | |
|---|---|---|---|
| 0071190 | 2/1983 | European Pat. Off. | H01C 7/00 |
| 071190 | 2/1983 | European Pat. Off. . | |
| 0416525 | 3/1991 | European Pat. Off. | H01C 7/02 |
| 3009501 | 1/1991 | Japan . | |

OTHER PUBLICATIONS

Patent Abstracts of Japan, vol. 15, No. 121, Mar. 25 1991.

*Primary Examiner*—Paul Lieberman
*Assistant Examiner*—M. Kopec

[57] ABSTRACT

To provide a thick film resistor involving small variations in resistance and TCR during the firing step and a low thermal coefficient of expansion. A thick film resistor composition containing 5–30 wt. % of a ruthenium pyrochlore oxide and 10–90 wt. % of a glass binder, wherein (1) the ruthenium pyrochlore oxide is $PbRuO_3$, (2) the glass binder is a glass which contains a first glass containing 61–85 wt. % of PbO, 10–36% of $SiO_2$ and 0–2 wt. % of $B_2O_3$, the total content of the PbO, $SiO_2$ and $B_2O_3$ accounting for 95 wt. % or more of the first glass, and in which 2–20 wt. % of $B_2O_3$ is contained in the entire glass binder, and (3) the first glass accounts for 5–30 wt. % of the thick film resistor composition, and the weight ratio of the ruthenium pyrochlore oxide to the first glass is 5:30–60:40.

3 Claims, 4 Drawing Sheets

PbO 45.9 wt%
B$_2$O$_3$ 10.8 wt%

PbO 65.0 wt%
B$_2$O$_3$ 0.0 wt%

LEAD PYROCHLORE DOES NOT DEGRADE

THICK FILM RESISTOR COMPOSITIONS

This is a continuation of application Ser. No. 08/071,847 filed May 7, 1993, now abandoned.

FIELD OF THE INVENTION

The present invention relates to a composition useful for producing a thick film resistor, more specifically, relates to a composition which uses a ruthenium pyrochlore oxide as a conducting component.

BACKGROUND OF THE INVENTION

A thick film resistor composition widely used in thick film resistor electrical parts, thick film hybrid circuits, etc. is a composition for forming a resistor thick film by printing the composition on a conductor pattern or an electrode formed on the surface of an insulating substrate, and then firing the print.

The thick film resistor composition is prepared by dispersing a conducting component and a glass binder in an organic medium (vehicle). The conducting component plays a principal role of determining the electrical properties of the thick film resistor, and a ruthenium pyrochlore oxide or the like is used as the conducting component. The glass binder consists of glass, and has a major role of retaining the thick film integrally and binding it to the substrate. The organic medium is a dispersing medium that affects the application properties, particularly rheology, of the composition.

Ruthenium pyrochlore oxide series thick film resistors containing ruthenium pyrochlore oxides such as lead ruthenate ($PbRuO_3$) are usually fired by means of a belt furnace. In this case, the substrates with prints of the resistor compositions to be fired are arranged on the belt of the belt furnace, and heated for firing. Generally, the firing is performed at a peak temperature of 850° C. for a peak time of 5–10 minutes. The travel from the inlet to the outlet of the belt furnace takes about 25–110 minutes, but the firing time becomes shorter year by year. As the belt speed increases, however, the resistance and the temperature coefficient of resistance (TCR) of the fired resistor fluctuate, and their variations increase. Some variation in the resistance can be corrected by a subsequent laser trimming step, while TCR cannot be adjusted. Thus, it is desired to minimize its fluctuations and variations due to the firing.

It is also important for the ruthenium pyrochlore oxide series resistor to have a small thermal coefficient of expansion (TCE). Since 96% alumina ceramic, an ordinary substrate, has a TCE of $75 \times 10^{-7}$/°C., the TCE of the thick film resistor should preferably be smaller than that.

SUMMARY OF THE INVENTION

It is thus the object of the present invention to provide a thick film resistor composition which can minimize fluctuations and variations in the resistance and TCR, especially TCR, during the firing step, and which gives a thick film resistor with a small thermal coefficient of expansion.

This object is attained by a thick film resistor composition containing 5–30 wt. % of a ruthenium pyrochlore oxide and 10–90 wt. % of a glass binder, wherein the ruthenium pyrochlore oxide is $PbRuO_3$, the glass binder is a glass which contains a first glass containing 61–85 wt. % of PbO, 10–36% of $SiO_2$ and 0–2 wt. % of $B_2O_3$, the total content of the PbO, $SiO_2$ and $B_2O_3$ accounting for 95 wt. % or more, and in which 2–20 wt. % of $B_2O_3$ is contained in the entire glass binder, the first glass accounts for 5–30 wt. % of the thick film resistor composition, and the weight ratio of the ruthenium pyrochlore oxide to the first glass is 5:30–60:40.

The object is also attained by a thick film resistor composition containing $PbRuO_3$, PbO and a glass binder, wherein the weight ratio of $PbRuO_3$ to PbO is 1:1–5:1, and the glass binder is a glass containing 2–20 wt. % of $B_2O_3$.

The present invention will be described in more detail below.

DETAILED DESCRIPTION OF THE INVENTION

Figure 1:
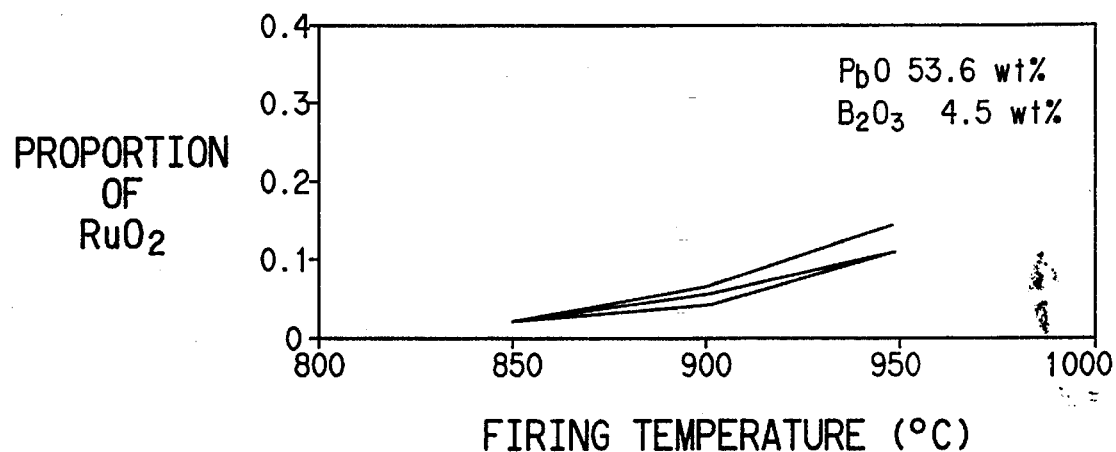
FIG. 1 is a diagram for illustrating the relationship between the firing temperature of the resistor composition and the decomposition of lead pyrochlore ($PbRuO_3$). The abscissa represents the firing temperature, and the ordinate the proportion of $RuO_2$ ($RuO_2$/(lead pyrochlore +$RuO_2$))
Figure 2:
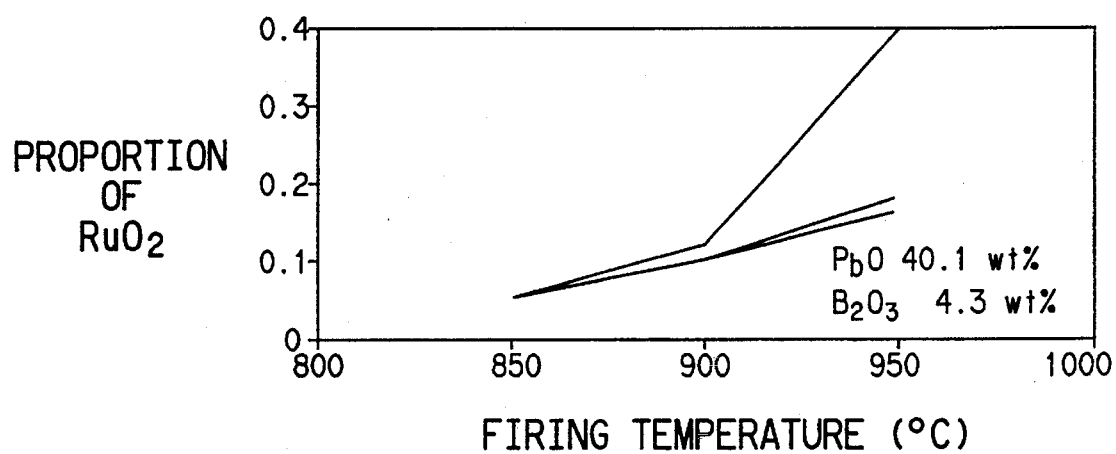
FIG. 2 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.
Figure 3:
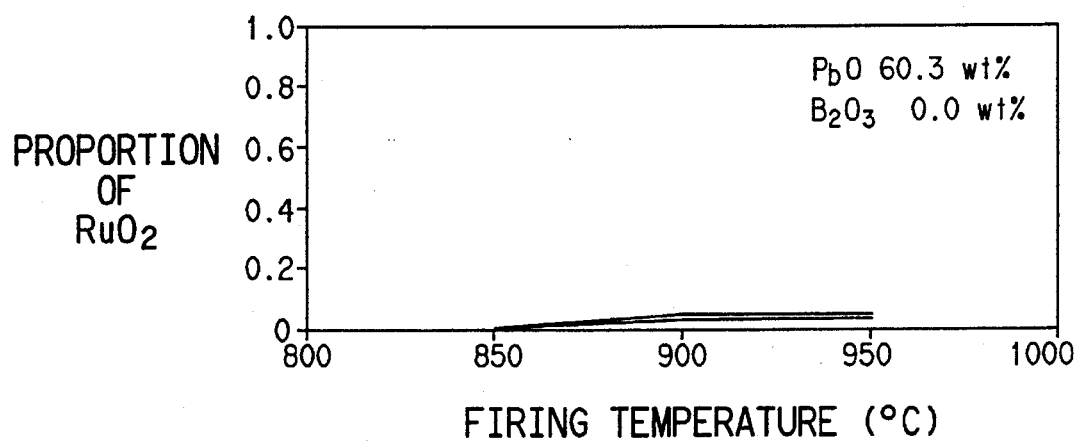
FIG. 3 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.
Figure 4:
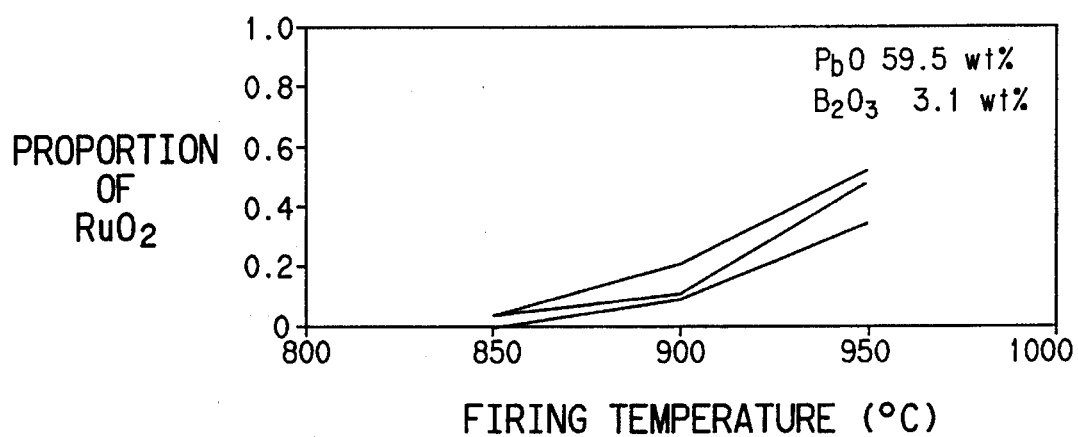
FIG. 4 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.
Figure 5:
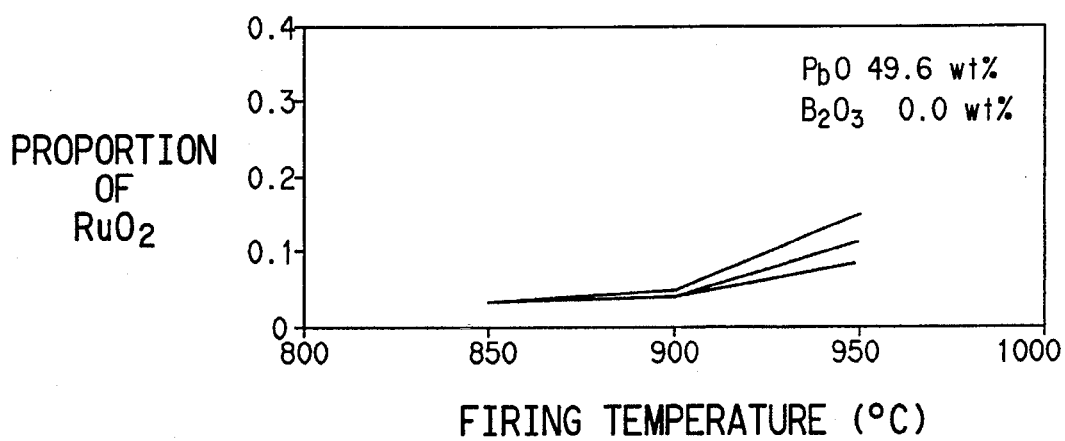
FIG. 5 is a diagram for illustrating the relationship between the firing temperature of the resistor composition and tho decomposition of lead pyrochlore ($PbRuO_3$), with the PbO and $B_2O_3$ contents varied. The abscissa and the ordinate are as defined in FIG. 1.
Figure 6:
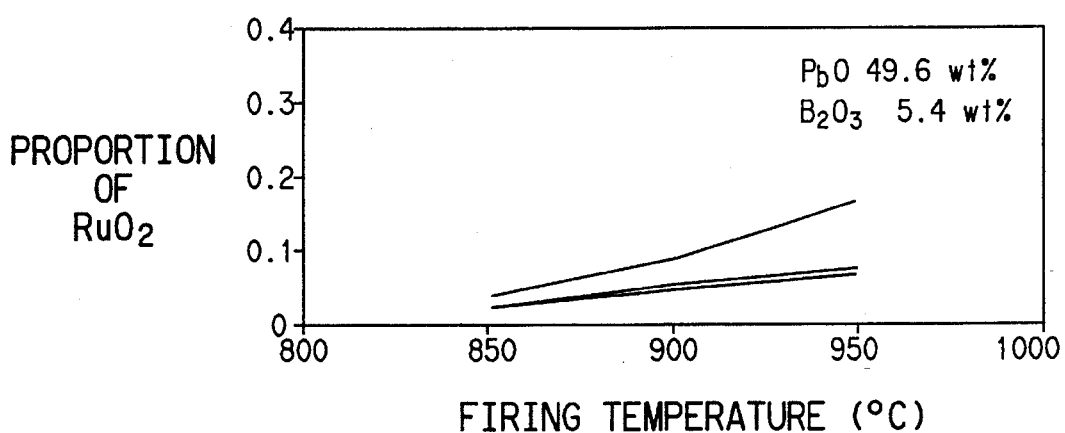
FIG. 6 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.
Figure 7:
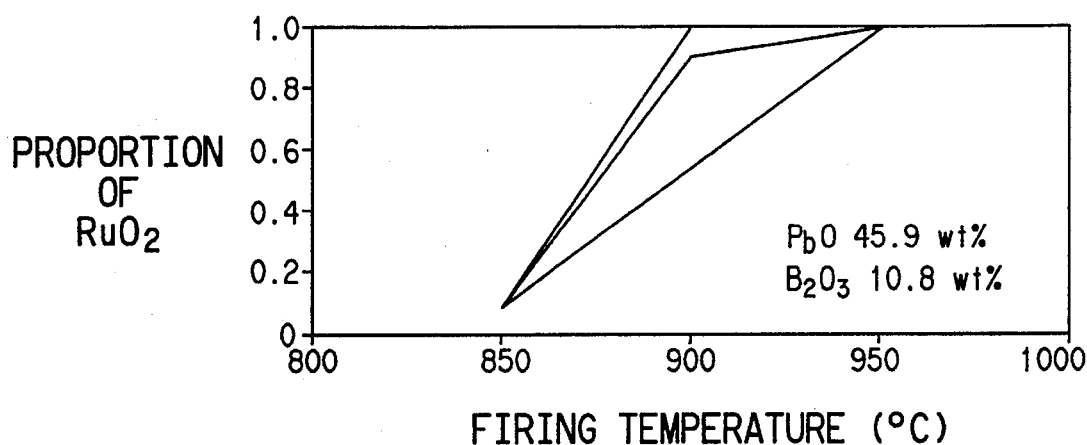
FIG. 7 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.
Figure 8:
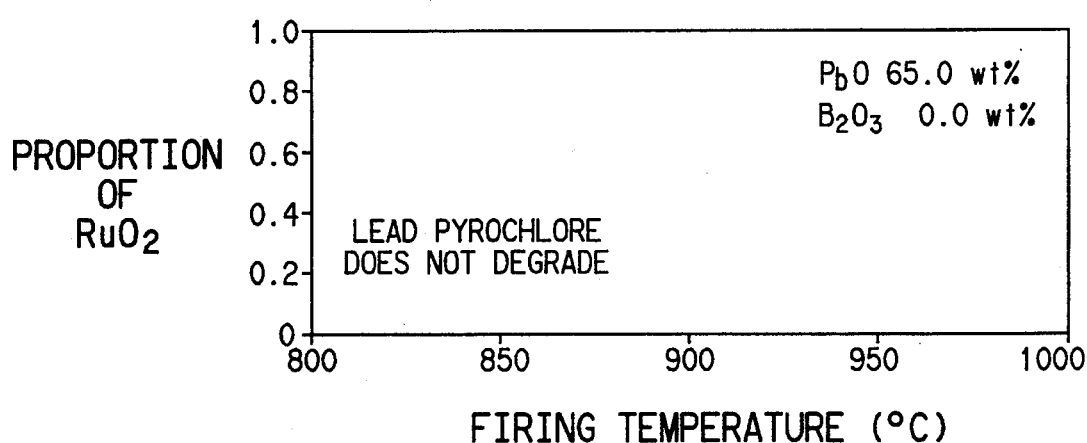
FIG. 8 is a diagram for illustrating the relationship between the firing temperature of the resistor composition and the decomposition of lead pyrochlore ($PbRuO_3$), with the PbO and $B_2O_3$ contents varied. The abscissa and the ordinate are as defined in FIG. 1.

The inventors of the present invention found that variations in the resistance and TCR of a ruthenium pyrochlore oxide-derived resistor composition during the firing step were ascribed to variations in the firing temperature, especially in the range of from 800° to 900° C. and that these variations in the resistance and TCR were closely related to the decomposition of the ruthenium pyrochlore oxide. Based on these findings, we attempted to obtain a resistor composition insensitive to the firing temperature by diminishing the temperature dependence of decomposition of $PbRuO_3$ in the temperature range of from 800° to 900 °C., and further by minimizing, preferably preventing, the decomposition of $PbRuO_3$ in this temperature range. In detail, the furnace for firing of the resistor composition, especially a belt furnace, involves short-time firing. When the belt speed is increased, therefore, the temperature distribution widens in the width direction of the belt. Moreover, it is known that in the resistor composition containing $PbRuO_3$ of the ruthenium pyrochlore structure, $PbRuO_3$ decomposes into ruthenium oxide and lead oxide, as in the formula $PbRuO_3 \rightarrow RuO_2 + PbO$, in the glass as an inorganic binder. The inventors found that this decomposition of $PbRuO_3$ was temperature-dependent, particularly, in the temperature range of from 800° to 900° C. and that as the decomposition proceeded, the firing temperature and the proportions of $RuO_2$ formed, i.e., the peak ratios $(RuO_2)/(RuO_2+\text{lead pyrochlore})$, are shown in FIGS. 1 to 8. A comparison of FIG. 1 and 2 shows that as the PbO content decreases, the proportion of $RuO_2$ formed increases. A comparison of FIGS. 3 and 4 and a comparison of FIGS. 5 and 6, by contrast, demonstrate that even at a high PbO content, the proportions of $RuO_2$ formed increases, if the $B_2O_3$ content is high. When the glass with a low PbO content and a high $B_2O_3$ content is used, the decomposition rate of the lead pyrochlore is very high as shown in FIG. 7. Especially when the glass containing 0 wt. % of PbO and a large amount (26 wt. %) of $B_2O_3$ is used, the lead pyrochlore completely decomposed. The use of the glass with a high PbO content and $B_2O_3$=0 wt. %, on the other hand, resulted in no decomposition of the lead pyrochlore. These results indicated that a glass formulation with a high $B_2O_3/PbO$ ratio or a low PbO content leads to the decomposition of $PbRuO_3$ into $RuO_2$.

TABLE 1

|  | Glass 1 | Glass 2 | Glass 3 | Glass 4 | Glass 5 | Glass 6 | Glass 7 | Glass 8 |
| --- | --- | --- | --- | --- | --- | --- | --- | --- |
| PbO | 53.6 | 40.1 | 60.3 | 59.5 | 49.6 | 49.6 | 45.9 | 65.0 |
| $SiO_2$ | 34.1 | 44.2 | 31.4 | 29.5 | 42.1 | 37.5 | 34.2 | 34.0 |
| $Al_2O_3$ | 4.9 | 6.3 | 2.7 | 2.5 | 1.1 | 4.6 | 2.9 | 1.0 |
| $B_2O_3$ | 4.5 | 4.3 | — | 3.1 | — | 5.4 | 10.8 | — |
| CuO | 1.1 | 2.2 | — | 2.8 | 1.9 | 1.9 | 3.2 | — |
| ZnO | 0.8 | 2.8 | — | 2.6 | — | — | 3.0 | — |
| CaO | 1.0 | 0.1 | — | — | 5.3 | 1.0 | — | — |
| $TiO_2/Fe_2O_3$ | — | — | — | — | — | — | — | — |
| $M_2O$ (M=K,Na) | — | — | — | — | — | — | — | — |
| MgO | — | — | — | — | — | — | — | — |
| BaO | — | — | 1.3 | — | — | — | — | — |
| $ZrO_2$ | — | — | 4.4 | — | — | — | — | — | resistance of the resistor lowered down to about 1/100, while its TCR rose to up to about 2000 ppm/°C. Then, the inventors noticed the relationship between the formulation of the glass binder of the resistor composition and the decomposition of $PbRuO_3$, and sought such a formulation of the glass binder that $PbRuO_3$ will minimally degrade.

First, each of various glasses and a powder of ruthenium pyrochlore oxide ($PbRuO_3$; may be referred to hereinafter as "lead pyrochlore") with specific surface areas of 7–10/m²/g and an average particle size of 50–100 angstroms were mixed with an organic solvent, terpineol. The mixture was coated onto the entire surface of an alumina substrate by means of a doctor blade, and dried at 150° C. After the organic component was burned out, the coating was fired at 850°, 900° and 950° C., and analyzed by X-ray diffraction. The peak intensities of the lead pyrochlore and $RuO_2$ of the X-ray diffraction pattern were determined, and the peak ratio expressed as $(RuO2)/(RuO_2+\text{lead pyrochlore})$ was calculated. Based on the results, the degree of decomposition of the lead pyrochlore was evaluated. Here, the peak intensity of the lead pyrochlore was the first peak intensity of the lead pyrochlore appearing near $2\theta=30.182°$, while the peak intensity of the $RuO_2$ was the first peak intensity of the $RuO_2$ appearing near $2\theta=28.13°$. To clarify the relationship between the formulation of the glass and the decomposition of the lead pyrochlore, the inventors investigated the relationship between the content of each metal oxide of each glass and the decomposition of the lead pyrochlore. As a result, it was found that the decomposition of the lead pyrochlore strongly depends on the contents of lead oxide (PbO) and boron oxide ($B_2O_3$). The formulations of the various glasses experimented are shown in Table 1. The As for the relationship between the thermal coefficient of expansion of the resistor and the formulation of the glass binder, it has been known that a low thermal coefficient of expansion (e.g., 5.8 ppm/°C.) can be achieved by using a glass with a high $B_2O_3$ content, i.e., a glass containing 2–20 wt. % of $B_2O_3$, preferably a glass with a high $B_2O_3$ content and free from PbO. As aforementioned, however, a glass with a high $B_2O_3$ content involves the decomposition of the lead pyrochlore.

Hence, the inventors studied how to suppress the decomposition of the lead pyrochlore while maintaining a low thermal coefficient of expansion. A glass with a specific PbO content and a specific $B_2O_3$ content (first glass) was combined with $PbRuO_3$ in specific proportions. The combined components were dispersed in a glass matrix with a specific $B_2O_3$ content (a glass binder containing the first glass as one component). The resulting composition was found to give a thick film resistor with a low thermal coefficient of expansion, with the decomposition of the lead pyrochlore suppressed, and with small fluctuations and small variations in the TCR during the firing step. The present invention is based on this finding. The same effect was found to be obtained by using PbO in place of the above-mentioned first glass with the specific PbO content and the specific $B_2O_3$ content, and combining the PbO with $PbRuO_3$ in specific proportions. The invention also is based on this finding. The resistor in which the lead pyrochlore decomposed was also shown to be poor in noise and electrostatic discharge (ESD). Thus, the resistor in accordance with the present invention is excellent in terms of noise and ESD because of the suppression of lead pyrochlore decomposition.

The constituents of the thick film resistor composition of the present invention will be described in further greater detail below.

A. Conducting Component

The thick film resistor composition of the present invention contains a ruthenium pyrochlore oxide as the conducting component. The ruthenium pyrochlore oxide is a kind of pyrochlore oxide which is a multi-component compound of $Ru^{+4}$, $Ir^{+4}$ or a mixture of these (M"), and being expressed by the following general formula $$(M_xBi_{2-x})(M'_yM''_{2-y})O_{7-z}$$

wherein

M is selected from the group consisting of yttrium, thallium, indium, cadmium, lead, copper and rare earth metals, M' is selected from the group consisting of platinum, titanium, chromium, rhodium and antimony, M" is ruthenium, iridium or a mixture of these, x is from 0 to 2 with the proviso that $x \leq 1$ for monovalent copper, y is from 0 to 0.5 with the proviso that when M' is rhodium or two or more of platinum, titanium, chromium, rhodium and antimony, y stands for 0 to 1, and z is from 0 to 1 with the proviso that when M is divalent lead or cadmium, z is at least equal to about x/2.

These ruthenium pyrochlore oxides are described in detail in the specification of U.S. Pat. No. 3,583,931.

Of these ruthenium pyrochlore oxides, lead pyrochlore, i.e., lead ruthenate ($PbRuO_3$ or $Pb_2Ru_2O_6$), is used in the present invention. $PbRuO_3$ is obtained easily in pure from, is not adversely affected by the glass binder, has a relatively small TCR, is stable even when heated to about 1000° C. in air, and is relatively stable even in a reducing atmosphere.

$PbRuO_3$ is used in a proportion of 5–30 wt. % preferably 10–25 wt. %, based on the total weight of the composition containing the organic medium. If based on the total content of the inorganic solids, its proportion is 7.1–42.9 wt. % preferably 14.2–35.8 wt. %. The total content of the inorganic solids refers to the total amount of the conducting component and the glass binder. In case the composition of the present invention contains an inorganic additive in addition to the conducting component and the inorganic binder, the total content of the inorganic solids is taken to contain the inorganic additive.

The compositions of the present invention may contain, as the conducting component, a ruthenium series pyrochlore other than $PbRuO_3$, such as bismuth ruthenate ($Bi_2Ru_2O_7$), $Pb_{1.5}Bi_{0.5}Ru_2O_{6.20}$, or $CdBiRu_2O_{6.5}$. y=0 for all these pyrochlores. Bismuth ruthenate is obtained easily in pure form, is not adversely affected by the glass binder, has a relatively small TCR, is stable even when heated to about 1000° C. in air, and is relatively stable even in a reducing atmosphere. Other substance, ruthenium oxide ($RuO_2$) or silver, may be contained as the conducting component.

Any of the conducting components other than $PbRuO_3$ is used in a proportion of 0–50 wt. % preferably 0–20 wt. % based on the total weight of the composition containing the organic medium. If based on the total content of the inorganic solids, its proportion is 0–71.5 wt. %, preferably 0–28.6 wt.%.

B. Glass Binder

The glass binder used in the thick film resistor composition of the present invention is a glass which contains a first glass containing 61–85 wt. % of PbO, 10–36 wt. % of $SiO_2$ and 0–2 wt. % of $B_2O_3$, the total content of the PbO, $SiO_2$ and $B_2O_3$ accounting for 95 wt. % or more, and in which 2–20 wt. % of $B_2O_3$ is contained in the entire glass binder.

In the present invention, the $B_2O_3$ content of the glass binder has to be 2–20 wt. %. The $B_2O_3$ content is determined in accordance with the kind and amount of the conducting component used, as well as the desired resistance of the thick film resistor. The formulations and proportions used of the first glass and the second glass to be described are selected so as to afford the desired $B_2O_3$ content.

The PbO content of the first glass is 61–85 wt. % preferably 63–78 wt. %, more preferably 63–70 wt. %. Its $SiO_2$ content is 10–36 wt. % preferably 15–36 wt. % more preferably 25–36 wt. %. Its $B_2O_3$ content is 0–2 wt. %, preferably 0 wt. %. The total content of PbO, $SiO_2$ and $B_2O_3$ in the first glass is 95 wt. % or more.

The first glass is used in a proportion of 5–30 %, preferably 10–25 wt. %, based on the total weight of the composition containing the organic medium. If based on the total content of the inorganic solids, its proportion is 7.1–42.9 wt. % preferably 14.2–35.8 wt. %.

The first glass must be used in such a range that the ratio of $PbRuO_3$ to the first glass will be 5:30–60:40, preferably 5:30–1:1.

In the present invention, the glass binder contains one or more glasses in addition to the first glass. This glass component other than the first glass is designated as the second glass.

The second glass is used in a proportion of 5–60 wt. %, preferably 10–40 wt. %, based on the total weight of the composition containing the organic medium. If based on the total content of the inorganic solids, its proportion is 7.1–85.7 wt. % preferably 14.2–57.2 wt. %.

Any of the glasses 1 to 7 listed in Table 1 can be used as the second glass. However, the preferred second glass is a glass containing 30–60 wt. % of $SiO_2$, 5–30 wt. % of CaO, 1–40 wt. % of $B_2O_3$, 0–50 wt. % Of PbO, and 0–20 wt. % of $Al_2O_3$, the total content of the $SiO_2$ CaO, $B_2O_3$, PbO and $Al_2O_3$ accounting for 35 wt. % or more of the glass (hereinafter referred to as "the second glass (A)").

The use of the second glass (A) enables the thermal coefficient of expansion (TCE) to be controlled to some extent and sintering to be controlled.

More preferably, the second glass used in the present invention is a mixture of the second glass (A) and a glass comprising $PbO$-$SiO_2$ glass with a PbO content of at least 50 wt, % (hereinafter referred to as "the second glass (B)"). The use of such two glasses with different lead oxide contents or softening points in the glass binder gives a thick film resistor with the low shape effect of resistance and TCR as well as small fluctuations in resistance and TCR due to the firsing of the overcoat glass. The low shape effect of resistance and TCR refers to small changes in resistance and TCR according to the change of the pad length (width) of the resistor, say, the change from 0.8 mm×0.8 mm to 0.5mm×0.5mm.

The second glass (A) contains only up to 50 wt. % of lead oxide, and so it is generally a high softening point glass. The second glass (B) contains at least 50 wt. % of lead oxide, and so it is generally a low softening point glass. The second glasses (A) and (B) each cannot be used alone as a glass binder for the thick film resistor composition, because the former glass cannot be sintered, while the latter is too soft as glass, making the resistor ill-shaped. By mixing such glasses so far considered unusable alone, the present invention achieved a thick film resistor with a low shape effect of resistance and TCR, as well as small changes in resistance and TCR due to calcination of the overcoat glass. This was quite unpredictable.

The second glass (A) is glass in which the total content sf $SiO_2$, CaO, $B_2O_3$, PbO and $Al_2O_3$ accounts for 35 wt. % or more of the glass. The $SiO_2$ content needs to be at least 30 wt. %. A lower content will result in an insufficiently high softening point. However, the content must be 60 wt. % or less. A higher content than this may result in crystallized Si. The CaO content needs to be at least 5 wt. %, but has to be 30 wt. % or less. A content in excess of 30 wt. % may cause Ca to be crystallized with other elements. The $B_2O_3$ content needs to be at least 1 wt. %, but should be 40 wt. % or less. A content higher than it may lead to no glass formation. The content of PbO must be 50 wt. % or less. A content exceeding 50 wt. % will result in an insufficiently high softening point. Preferably, it is 0–30 wt. %, more preferably 0–20 wt. %. The content of $Al_2O_3$ must be 20 wt. % or less. A content exceeding 20 wt. % will result in no glass formation. The preferred content is 0–5 wt. %.

The second glass (A) is used in a proportion of 5–35 wt. %, preferably 10–25 wt. %, based on the total weight of the composition containing the organic medium. If based on the total content of the inorganic solids, its proportion is 7–50 wt. %, preferably 14–36 wt. %.

The second glass (B) is PbO—$SiO_2$ glass with a PbO content of at least 50 wt. %. Only when the second glass (A) is used in combination with the second glass (B), can the reduction of the shape effect of the resistor TCR, as well as the reduction of changes in resistance and TCR due to firing of the overcoat glass, be achieved.

The second glass (B) is preferably a glass containing 50–80 wt. % of PbO, 10–35 wt. % of $SiO_2$, 0–10 wt. % of $Al_2O_3$, 1–10 wt. % of $B_2O_3$, 1–10 wt. % of CuO, and 1–10 wt. % of ZnO, the total content of the PbO, $SiO_2$, $Al_2O_3$, $B_2O_3$, CuO and ZnO being 95 wt. % or more of the glass. By mixing the second glass (B) of this formulation and the aforementioned second glass (A), the shape effect of TCR and changes in resistance and TCR due to calcination of the overcoat glass are diminished, and the sintering properties are also improved.

The second glass (B) is used in a proportion of 5–40 wt. %, preferably 10–35 wt. %, based on the total weight of the composition containing the organic medium. If based on the total content of the inorganic solids, its proportion is 7–57 wt. % preferably 14–50 wt. %.

In the thick film resistors composition of the present invention, the glass formulation of the glass binder is preferably selected such that the softening point of the aforementioned first glass will be lower than that of the second glass (A), but higher than that of the second glass (B).

The first and second glasses that are used as the glass binder in the present invention may each contain, in addition to the aforementioned components, less than 15 wt. % of components for regulating the thermal expansion coefficient of the thick film resistor and the maturing temperature of the glass binder. As stated earlier, 96% alumina ceramic, an ordinary substrate, has a thermal expansion coefficient of $75 \times 10^{-7}/°C.$, and so the thermal expansion coefficient of the thick film resistor should preferably be lower than that. The thermal coefficient of expansion can be regulated by adjusting the contents of silica, lead oxide and boron oxide. The incorporation of a small amount of an oxide of lithium, potassium or sodium may result in a regulated thermal expansion coefficient. Lithium oxide is advantageously incorporated in the glass binder component to a content of up to about 3 wt. %. $ZrO_2$ in an amount of up to about 4% enhances the resistance of the glass to dissolution in an alkali solution, while $TiO_2$ enhances the resistance of the glass to attack by an acid. When the glass is PbO-free zinc aluminoborosilicate glass, the incorporation of $Na_2O$ can provide a favorable thermal expansion coefficient range.

The above-described glasses as the glass binders can each be produced by an ordinary glass manufacturing technique. Namely, they can be produced by mixing the desired components or their precursors, e.g., $H_3BO_3$ for $B_2O_3$, in the desired proportions, and heating the mixture to form a melt. As is well known in the art, the heating is performed to a peak temperature until the melt will become completely liquid and no gases will be generated. In the present invention, the peak temperature is in the range of from 1100° to 1500 ° C., usually from 1200° to 1400 ° C. Then, the melt is typically poured onto a cold belt or in cold running water for quenching. Then, the product is milled, if desired, to reduce its particle sizes.

More specifically, these glasses can be produced by melting for 20 minutes to 1 hour at about 1200°–1400° C. in a platinum crucible in a silicon carbide furnace electrically heated. By treatment with a rotary or oscillating mill, the final particle size can be adjusted to 1–10 $m^2/g$. The oscillating mill treatment is carried out by placing inorganic powder and cylinders of alumina, etc. together with an aqueous medium in the container, and then oscillating the container for a specified period of time.

C. Inorganic Additive

The thick film resistor composition of the present invention may contain an inorganic additive. For example, there may be incorporated inorganic oxides, such as $Nb_2O_5$, MnO and $Cu_2O$, as TCR regulators, and oxides with low TCEs, such as $ZrSiO_4$, as TCE fillers. $ZrSiO_4$ contributes to improved laser trimming properties of the thick film resistor.

The inorganic additive is used in a proportion of 0.05–15 wt. % based on the total weight of the composition containing the organic medium, or 7.1–21.4 wt. % based on the total content of the inorganic solids.

In the present invention, lead oxide (PbO) can be used in place of the first glass. In this case, the ratio of $PbRuO_3$ to PbO is 1:1–5:1 by weight, and the preferred ratio is 1:0.8–4:1. PbO can be used as a coat on the surfaces of $PbRuO_3$ particles. Coating with PbO can be performed by heating $PbRuO_3$ powder at a low temperature (e.g., 400°–600° C.) in a Pb-rich atmosphere. This can be done by superimposing a large crucible and a small crucible on each other, placing PbO powder in the large crucible, placing $PbRuO_3$ powder in the small crucible, and heating the crucible with a cover applied to the whole of them. The coating with PbO can also be carried out by coating the surfaces of $PbRuO_3$ powder with PbO at the molecular level.

D. Organic Medium

The above inorganic solids of the present invention are dispersed in the organic medium or vehicle to make a printable composition paste. The organic medium is used in a proportion of 20–40 wt. % preferably 25–35 wt. % based on the total weight of the composition.

Any inert liquids can be used as the vehicle. There may be used water or one of various organic liquids, the water or each liquid containing or not containing thickening agents and/or stabilizers and/or other ordinary additives. Examples of the organic liquid usable are aliphatic alcohols, esters (e.g., acetates and propionates) of such alcohols, terpenes such as pine root oil or terpineol, and solutions of resins (e.g., polymethacrylates of lower alcohols or ethyl cellulose) in solvents (e.g., pine root oil and monobutyl ether of ethylene glycol monoacetate). In the vehicle may be incorporated volatile liquids for promoting rapid solidification after application to the substrate. Alternatively, the vehicle may be composed of such volatile liquids. The preferred vehicle is based on ethyl cellulose and β-terpineol.

E. Methods of Preparation, Application and Testing

The thick film resistor composition of the present invention can be produced by means of, say, a triple roll mill.

In the present invention, it is permissible to fire the first glass and PbRuO$_3$ preliminarily, and add the fired product to the vehicle. This preliminary firing involves, for example, heating at about 600°–1000° C. for about 0.2–4 hours in an air atmosphere. Such preliminary firing of the first glass and PbRuO$_3$ permits a further improvement of the stability of TCR or the like in the firing to be performed later.

The resistor composition of the present invention can be printed as a film on a ceramic, alumina or other dielectric substrate by an ordinary method. Advantageously, an alumina substrate is used, and the resistor composition is printed on a fired palladium-silver terminal.

Generally, a screen stencil technique can be used preferably. The substrate with printed pattern is generally allowed to stand for leveling the printed pattern, and dried for about 10 minutes at an elevated temperature of, say, 150° C. Then, is is fired at a peak temperature of about 850° C. in a belt furnace in air.

The following is a description of the testing methods for the various characteristics of the thick film resistor composision.

(1) Method of preparing a thick film resistor composition paste

The predetermined inorganic solid and vehicle are mixed, and the mixture is kneaded with a roll mill to make a paste.

(2) Printing and calcination

A Pd/Ag thick film conductor is printed on a 1 inch×1 inch (25 mm square) 96% alumina substrate to a dry film thickness of 18±2 μm, and is then dried for 10 minutes at 150° C. This Pd/Ag thick film conductor contains 0.5 wt. % of Pd in the paste.

Then, the thick film resistor composition paste is printed to a size of 0.8 mm×0.8 mm and a dry film thickness of 18±2 μm. The print is dried at 150° C. for 10 minutes, and then heated in a box furnace for calcination. The temperature profile of the box furnace is such that the dried film is heated for 10 minutes at 350° C. to burn out the organic medium, whereafter the heated film is fired separately at a peak temperature of 800° C. for 10 minutes, or at a peak temperature of 850° C. for 10 minutes, or at a peak temperature of 900° C. for 10 minutes, followed by cooling. The firing time is such that the period from the time when the temperature during firing has exceeded 100° C. until the time when the temperature during cooling has becomes lower than 100° C. is 30 minutes.

(3) Measurement of resistance and TCR

The resistance (R) is measured with a terminal-patterned probe using an autorange autobalance digital ohmmeter with a precision of 0.01%. Specifically, samples are laid on the terminal post in the chamber, and electrically connected with the digital ohmmeter. The temperature in the chamber is adjusted to 25° C. and equilibrated. Then, each sample is measured for resistance, and the readings are recorded.

Then, the temperature in the chamber is raised to 125° C. and equilibrated. Then, each sample is measured again for resistance, and the readings are recorded.

TCR (here, hot temperature coefficient of resistance or HTCR) is calculated from the following equation:

HTCR $((R_{125C}-R_{25C})/R_{25C})\times 10000$ ppm/°C.

The firing temperature dependences of the resistance and TCR are evaluated by the difference in resistance ($\Delta R(a-b)$) and the difference in TCR ($\Delta HTCR(a-b)$) between the resistors calcined at different peak temperatures (a° C. and b° C.).

$\Delta R(a-b)=((R(a°\ C.)-(b°\ C.)/R(b°\ C.)))\times 100$ (%)

$\Delta HTCR(a-b)=HTCR(a°\ C.)-HTCR(b°\ C.)$ (ppm/°C.)

[Embodiment]

PbRuO$_3$ for use as the conducting component in the Examples and Comparitive Example was prepared by firing PbO and RuO$_2$ in air at 800°–1000° C. and then finely pulverizing the fired product to particles with surface areas of about 3–60 m$^2$/g. The RuO$_2$ was one with a surface area of about 25 m$^2$/g.

Four glasses (glasses a, b, c and d) for use as glass binders were produced by heat-melting the predetermined materials at 1000°–1700° C. for about 30 minutes to 5 hours depending on the formulation of the glass until the generation of gases would completely stop; then quenching the melt in water; and milling the quenched product to specific surface areas of about 2–5 m$^2$/g. The formulations of these glasses are shown in Table 2. Glass a corresponds to the glass of the Comparative Example, glass b to the first glass of the invention, glass c to the second glass (A), and glass d to the second glass (B).

TABLE 2

| Kind of Glass | Glass a | Glass b | Glass c | Glass d |
|---|---|---|---|---|
| PbO | 59.9 | 65.0 | 55.0 | 59.5 |
| SiO$_2$ | 32.3 | 34.0 | 14.0 | 29.5 |
| Al$_2$O$_3$ | 4.7 | 1.0 | 7.5 | 2.5 |
| B$_2$O$_3$ | 3.1 | — | — | 3.1 |
| CsO | — | — | — | 2.8 |
| ZnO | — | — | — | 2.6 |
| CaO | — | — | 21.5 | — |
| TiO$_2$/Fe$_2$O$_3$ | — | — | 0.5 | — |
| M$_2$O (M=K,Na) | — | — | 0.5 | — |
| MgO | — | — | 1.0 | — |
| BaO | — | — | — | — |
| ZrO$_2$ | — | — | — | — |

The organic media used in the Examples and Comparative Example were mixtures of 10–30 parts of ethyl cellulose and 90–70 parts of β-terpineol.

Three compositions (Comparative Example 1, Example 1 and Example 2) were prepared using the starting materials shown in Table 3. In preparing this composition of Comparative Example 1, the respective solid components were separately mixed with the organic medium. In preparing the compositions of Examples 1 and 2, PbRuO$_3$ and glass b were precalcined for 1 hour at 850° C. and then pulverized to make powders, which were used as the starting materials. The resulting three compositions were subjected to the aforementioned testing methods so that these samples were measured for resistance and HTCR. The results shown in Table 3 were obtained.

As indicated in Table 3, the firing temperature dependence of resistance and TCR, especially the firing temperature dependence of TCR, of Examples 1 and 2 representing the compositions of the present invention were smaller than Comparative Example 1 in the the temperature range of from 800° to 900° C.

TABLE 3

|  | Comp. Ex. 1 | Example 2 | Example 3 |
|---|---|---|---|
| PbRuO$_3$ | 11.5wt.% | 16.8wt.% | 16.8wt.% |
| RuO$_2$ | 11.5wt.% | 3.0wt.% | 3.0wt.% |
| Glass a | 47.0wt.% | — | — |
| Glass b | — | 28.9wt.% | 16.8wt.% |

TABLE 3-continued

|  | Comp. Ex. 1 | Example 2 | Example 3 |
|---|---|---|---|
| Glass c | — | 20.1wt. % | 12.0wt. % |
| Glass d | — | — | 20.0wt. % |
| $Nb_2O_5$ | — | 1.2wt. % | 1.2wt. % |
| Organic Medium | 30.0wt. % | 30.0wt. % | 30.2wt. % |
| R (800° C.) | 11.68 kΩ | 17.22 kΩ | 36.42 kΩ |
| R (850° C.) | 11.08 kΩ | 17.93 kΩ | 31.52 kΩ |
| R (900° C.) | 6.62 kΩ | 15.39 kΩ | 22.13 kΩ |
| HTCR (800° C.) | +48 | +25 | +123 |
| HTCR (850° C.) | +126 | +16 | +63 |
| HTCR (900° C.) | +345 | +14 | +69 |
| ΔR (850–800) | −5.1% | +4.1% | −13.5% |
| ΔR (900–850) | −40.3% | −14.2% | −29.8% |
| ΔHTCR (850–800) | +78 | −41 | −60 |
| ΔHTCR (900–850) | +219 | +2 | +6 |

In terms of the thermal coefficient of expansion, Comparitive Example 1, Example 1 and Example 2 were all satisfactory.

These results demonstrate that the present invention provides a thick film resistor wish a satisfactory thermal coefficient of expansion maintained and a TCR improved.

As has been described, the thick film resistor composition of the present invention provides a thick film resistor having small variations in TCR during the firing step and a low thermal coefficient of expansion, because the decomposition of lead pyrochlore ($PbRuO_3$) is suppressed and the firing temperature dependence of resistance and TCR is minimal.

What is claimed is:

1. A thick film resistor composition comprising:

(a) 5–30 wt. % lead pyrochlore oxide;
   (b) 0–20 wt. % $RuO_2$;
   (c) 10–25 wt. % a first glass comprising 61–85% wt. % PbO, 10–36 wt. % $SiO_2$ and 0–2 wt. % $B_2O_3$;
   (d) 10–40 wt. % a second glass comprising 30–60 wt. % $SiO_2$, 5–30 wt. % CaO, 1–40 wt.% $B_2O_3$, 0–50 wt. % PbO, 0–20 wt. % $Al_2O_3$; and with the proviso that (i) the total content of PbO, $SiO_2$, and $B_2O_3$ in the first glass comprises at least 95 wt.% of the first glass;
   (ii) the total content of PbO, $SiO_2$, CaO, $Al_2O_3$ and $B_2O_3$ comprises at least 35 wt. % of the second glass;
   (iii) the $B_2O_3$ content of the first and second glasses is 2–20 wt. %; and
   (iv) the weight ratio of the lead pyrochlore oxide to the first glass is in the range of 5:30 to 60:40.

2. The composition of claim 1 which further contains an additional glass component comprising 50–80 wt. % PbO, 10–35 wt. % $SiO_2$, 0–10 wt. % $Al_2O_3$, 1–10 wt. % $B_2O_3$, 1–10 wt. % CuO, and 1–10 wt. % ZnO; with the proviso that the total content of PbO, $SiO_2$, $Al_2O_3$, $B_2O_3$, CuO and ZnO comprises at least 95 wt. % said additional glass component (B).

3. The composition of claims 1 and 2 further comprising an inorganic additive selected from the group $Nb_2O_5$, MnO, $Cu_2O$, $ZrSiO_4$ or mixtures thereof.

* * * * *